United States Patent
Yanami et al.

(10) Patent No.: US 8,676,548 B2
(45) Date of Patent: Mar. 18, 2014

(54) SUPPORT APPARATUS USING OBJECTIVE FUNCTION

(75) Inventors: Hitoshi Yanami, Kawasaki (JP); Hirokazu Anai, Kawasaki (JP); Tsuneo Nakata, Kawasaki (JP); Hidenao Iwane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 751 days.

(21) Appl. No.: 12/628,349

(22) Filed: Dec. 1, 2009

(65) Prior Publication Data
US 2010/0153074 A1  Jun. 17, 2010

(30) Foreign Application Priority Data
Dec. 17, 2008 (JP) ................. 2008-320904

(51) Int. Cl.
  *G06F 7/60* (2006.01)
  *G06F 17/10* (2006.01)
(52) U.S. Cl.
  USPC ............................................. 703/2
(58) Field of Classification Search
  USPC ........................................ 703/1, 2
  See application file for complete search history.

(56) References Cited

U.S. PATENT DOCUMENTS

| 6,865,567 | B1 * | 3/2005 | Oommen et al. | 1/1 |
| 7,395,235 | B2 * | 7/2008 | Dhurandhar et al. | 705/36 R |
| 7,742,902 | B1 * | 6/2010 | Ruetsch | 703/2 |
| 7,751,917 | B2 * | 7/2010 | Rees et al. | 700/97 |
| 7,756,688 | B2 * | 7/2010 | Averill et al. | 703/2 |
| 2005/0143845 | A1 * | 6/2005 | Kaji | 700/28 |
| 2007/0005313 | A1 * | 1/2007 | Sevastyanov et al. | 703/2 |

FOREIGN PATENT DOCUMENTS

JP   2002-117018   4/2002

OTHER PUBLICATIONS

N Beume, G Rudolph, Faster S-Metric Calculation by Considering Dominated Hypervolume as Klee's Measure Problem, 2006, University of Dortmund, Department of Computer Science, Chair of Algorithm Engineering, Dortmund, Germany.*
Hirokazu Anai, et al., "Introduction to Computational Real Algebraic Geometry" Mathematic Seminar 11, pp. 1-13, Nov. 2007.

* cited by examiner

*Primary Examiner* — Aniss Chad
(74) *Attorney, Agent, or Firm* — Staas & Halsey LLP

(57) ABSTRACT

A design support apparatus for determining a plurality of objective functions for modeling an object having a plurality of elements, each of the elements providing variable geometrical parameters, the design support apparatus includes a memory for storing the variable geometrical parameters and a processor for executing a process including: determining boundary information associated with specified geometrical parameters of the elements which indicate a state of contact between the elements, dividing the variable geometrical parameters into a plurality of groups on the basis of the boundary information, and determining the plurality of objective functions for each of the groups by using the variable geometrical parameters.

16 Claims, 13 Drawing Sheets

SUPPORT APPARATUS USING OBJECTIVE FUNCTION

CROSS-REFERENCE TO RELATED APPLICATION

This application is based upon and claims the benefit of priority of the prior Japanese Patent Application No. 2008-320904, filed on Dec. 17, 2008, the entire contents of which are incorporated herein by reference.

FIELD

The embodiment discussed herein is related to a design support apparatus.

BACKGROUND

In the field of design support, there is a technique for obtaining an objective function in multi-objective optimization design supporting technologies and the like, which are employed in designing a shape of a slider included in a hard disk, and the like. Along with the increasing packaging density and storage capacity of hard disks, an amount of distance between a magnetic disk and a header of such a hard disk has become increasingly small. Therefore, it has been demanded to design a slider so as to reduce an amount of variation of flying of the slider, which arises due to an altitude difference and disk radius position of the slider.

As shown in FIG. 13, a slider denoted by an a reference numeral 1301 is equipped at the bottom part of the tip of an actuator 1302 which moves over a magnetic disk mounted inside a hard disk, and the position of a header is calculated from the shape of the slider 1301.

In design problems in engineering, several conditions are given that should be met simultaneously. When determining an optimum flying performance of the slider 1301, it is necessary to efficiently improve performance such as flying height (1303 of FIG. 13), roll (1304) and pitch (1305) which are concerning the position of the header and represented by mathematical functions associated with shape-related parameters.

To solve such a type of problems, multi-objective optimization methods are used. In almost all cases, it is impossible to optimize all the objective functions simultaneously. There is a trade-off relation between them, i.e., it is only possible to improve one objective function at the cost of another. In a multi-objective optimize problem, the points that cannot be improved in all the objective functions at the same time form an optimal set called a Pareto optimal front.

Up to now, multi-objective optimization problems have not been directly handled, but, as shown in the following formula, single-objective optimizations have been performed, in which a linear summation f of individual terms obtained by multiplying an objective function $f\_i$ by a weight $m\_i$ is calculated to obtain a minimum value of the linear summation f.

$$f = m\_1 * f\_1 + \ldots m\_t * f\_t$$

Further, by executing a program, processing has been performed so that, in conjunction with gradual small changes of respective values of parameters p, q, r and the like shown in FIG. 14, which determine a shape S of a slider, output values of the function f are calculated, and from the calculated output values thereof, a shape of the slider having values of the parameters p, q, r and the like which make the output values of the function f to be minimum is derived.

Here, the function f depends on the weight vectors $\{m\_i\}$. In actual designs, processing has been performed so that, in conjunction with gradual changes of the weight vectors $\{m\_i\}$ which are further made, minimum values of the function f for respective changed values of the weight vectors $\{m\_i\}$ are calculated, and by making a comprehensive decision regarding balancing of respective minimum values of the function f and the corresponding values of the weight vectors $\{m\_i\}$, a shape of the slider is determined.

Furthermore, methods including a method which is called the normal boundary intersection (NBI) method, and the like, have been also known to those skilled in the art, the methods enabling obtaining of a Pareto curved surface (an optimized curved surface) in the multi-objective optimization by using a numerical analysis scheme. Japanese Laid-open Patent Publication No. 2002-117018 discloses a related technique.

However, in the foregoing optimization technology associated with a single objective function f in existing technologies, it is necessary to iteratively perform flying calculations which require a large amount of time. Particularly, further detailed research for a shape of a slider requires input parameters (corresponding to parameters p, q, r and the like shown in FIG. 14) whose number is around twenty, thus, more than ten thousand cycles of flying calculations, and leads to a disadvantage in that it takes a significantly large amount of time to perform optimization of a shape of a slider.

For example, FIG. 15 is an operational flowchart of processing performed by a system using existing technologies. Subsequent to setting of specifications (step S1501) and setting of weight vectors (step S1502), in calculations with respect to processing for optimization of a single objective function (step S1503), it is necessary to perform a huge number of calculations for around several ten thousand groups of input parameters.

Further, in this method, a minimum value of the function f (as well as the values of input parameters as of then) depends on how to determine the weight vectors ($m\_1, \ldots, m\_t$). In actual designs, a situation, in which it is desired to compare values of the function f resulting from performing optimization of the function f for various groups of weight vectors, occurs frequently. However, in the foregoing existing technologies, returning the flow of iterative processing from step S1504 to step S1502 shown in FIG. 15 for every group of changed weight vectors makes it necessary to restart a series of optimization calculations including calculations with respect to flying height, which incur high cost. Therefore, the number of kinds of weight vectors which can be proved is restricted. Accordingly, it takes an enormous time to determine final weight vectors (step S1505 in FIG. 15) and obtain the output of an optimum shape (a group of optimum parameters) of the slider (step S1506 in FIG. 15).

Moreover, in each of processes of minimizing the values of the function f, it is possible to obtain only one point, which makes the values of the function f to be minimum, on a Pareto curved surface, thus, causing a disadvantage in that, it is difficult to estimate optimum mutual relations among objective functions, and therefore, it is impossible to feed back design related information, such as a piece of information related to the mutual optimum relations among objective functions, to the design.

Furthermore, the forgoing existing technologies, in which the Pareto curved surface is obtained by using the numerical analysis scheme, have disadvantages in that, in the case where a feasible region is a non-convex region, the Pareto curved surface cannot be solved, and further, in the case where an original point (a termination point) necessary for obtaining the Pareto curved surface is close to the targeted Pareto curved surface, sometimes, algorithms employed in the numerical analysis cannot function in an expected manner.

SUMMARY

According to an aspect of the invention, an design support apparatus, for determining a plurality of objective functions for modeling an object having a plurality of elements, each of the elements providing variable geometrical parameters, includes: a memory for storing the variable geometrical parameters; and a processor for executing a process including: determining boundary information associated with specified geometrical parameters of the elements which indicate a state of contact between the elements; dividing the variable geometrical parameters into a plurality of groups on the basis of the boundary information; and determining the plurality of objective functions for each of the groups by using the variable geometrical parameters.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, preferred embodiments will be described in detail with reference to drawings.

Figure 1:
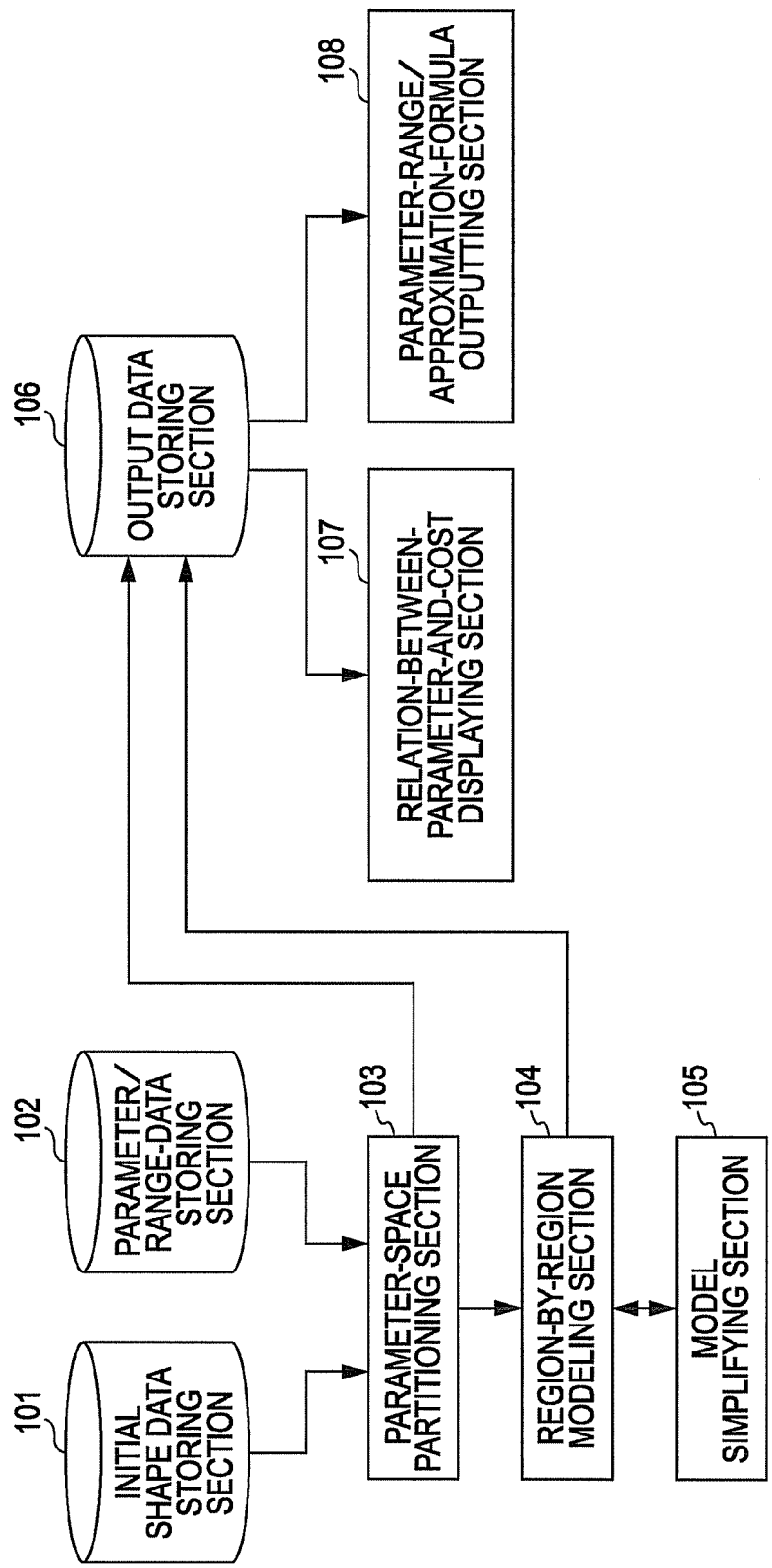
FIG. 1 is a diagram illustrating a configuration of an embodiment according to the present invention.

FIG. 1 is a diagram illustrating a configuration of an embodiment according to the present invention (which will be hereinafter referred to as "this embodiment").

This embodiment includes an initial shape data storing section 101, a parameter/range-data storing section 102, a parameter-space partitioning section 103, a region-by-region modeling section 104, a model simplifying section 105, an output data storing section 106, a relation-between-parameter-and-objective-function displaying section 107 and a parameter-range/approximation-formula outputting section 108.

Firstly, fundamental concepts of this embodiment will be described.

In this embodiment, as design specifications with respect to the scope of searching for a shape of a slider, for sample groups associated with around several hundred parameters related to the shape and range data thereof, simulation calculations with respect to flying of the slider are executed to output individual objective functions. Next, a regression analysis is performed for data files including the sample groups of parameters and the objective functions obtained for respective sample groups, and thereby, the individual objective functions with respect to the shape of the slider are approximated by objective-function approximation formulae created on the basis of sample groups of parameters, respectively. By formulating the individual objective functions in such a way as described above, it is possible to easily perform various kinds of analysis, such as visualization of Pareto boundaries, in the multi-objective optimization.

However, such a method is unlikely to enable obtaining of a desired result when attempting to create an approximation model covering the whole of a parameter space. A reason for this is that the objective functions are not smooth over all the parameter space.

In such a case, for example, focusing on an experience that, in the case where movement amounts of respective parameters are relatively small, the approximation is likely to be achieved by using a low-order polynomial, a method can be considered, in which, the approximation calculation is commenced by using a polynomial of a relatively lower order, and subsequently, in accordance with a requirement for an approximation degree and an upper limit of the order which are provided in advance, in the case where it is determined that the resultant approximation degree of the approximation calculation is inadequate, the approximation calculation is iteratively performed by raising the order of the polynomial. However, forcing each of the objective functions to be represented by a polynomial causes rising of the order of the approximation polynomial, and as a result, the model analysis is likely to be difficult.

In order to prevent such disadvantages, as an attempt at partitioned modeling, in the case where the order of a targeted approximation model becomes high, and the objective functions do not seem to be smooth, a method can be considered, which enables partitioning of parameters and performing modeling independently for respective partitioned groups of parameters. However, it is difficult to determine whether the objective functions are not smooth, and in order to raise the precision of determination therefor, a large amount of data related to groups of parameters and the corresponding groups of individual objective functions is required, and as a result, creation of an approximation model in such a way incurs high cost.

Therefore, in this embodiment, the following solution is provided.

Figure 2:
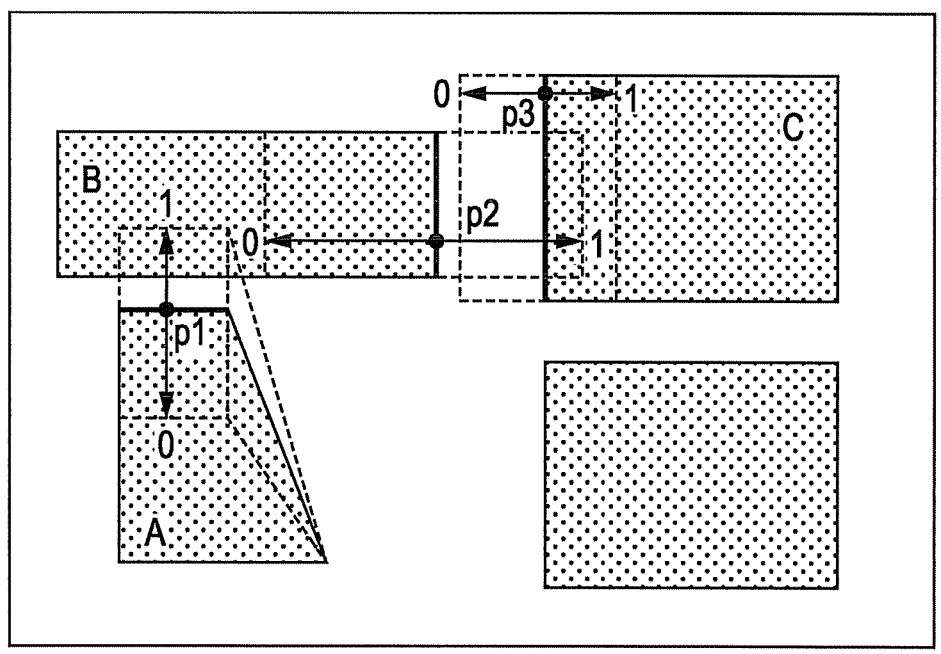
FIG. 2 is a schematic diagram illustrating a design of a shape of a slider included in a hard disk.

FIG. 2 is a schematic diagram illustrating a design of a shape of a slider included in a hard disk. In FIG. 2, each of parameters p1, p2 and p3 moves so as to take a value within a range [0, 1] denoted by a line having arrows at both ends thereof shown in FIG. 2, and in conjunction with the movement thereof, each of sides, which are denoted by extra-thick lines, also moves. In this configuration, once a group of parameters (p1, p2, p3) is determined, one of the shapes of the slider is determined. From the configuration shown in FIG. 2, the following knowledge can be intuitively understood. That is, in the case where a group of parameters (p1, p2, p3) is selected so that a side belonging to each of the shapes, the side being denoted by an extra-thick line, is out of contact with sides of the other shapes, each of the shapes A, B and C forms an isolated island. In contrast, a group of parameters (p1, p2, p3) is selected so that a side belonging to a certain shape, the side being denoted by an extra-thick line, is in contact with a side of one of the other shapes or sides of all of the other shapes, two shapes or three shapes among the shapes A, B and C are combined. As a result of this combination, as a whole, two islands or one island are (or is) formed.

In the case where a side belonging to a certain shape is in contact with a side belonging to a different shape in such a condition as described above, in this embodiment, this condition is expressed by a phrase; "a phase of the shape of a slider changes". In designs of a shape of a slider included in a hard disk, when a phase of the shape of a slider changes, a behavior with respect to a flying characteristic (an objective function) is likely to change to a great degree. Further, within ranges where the phase does not change, it is possible to approximate individual objective functions with respect to the design of the slider by using polynomials each being of a relatively low order. In other words, when different islands contact each other, the corresponding objective functions are likely to fall in a condition they are not smooth or are discontinuous. Alternatively, in some cases, a simulator responses back huge values as output values of the objective functions.

Figure 3:
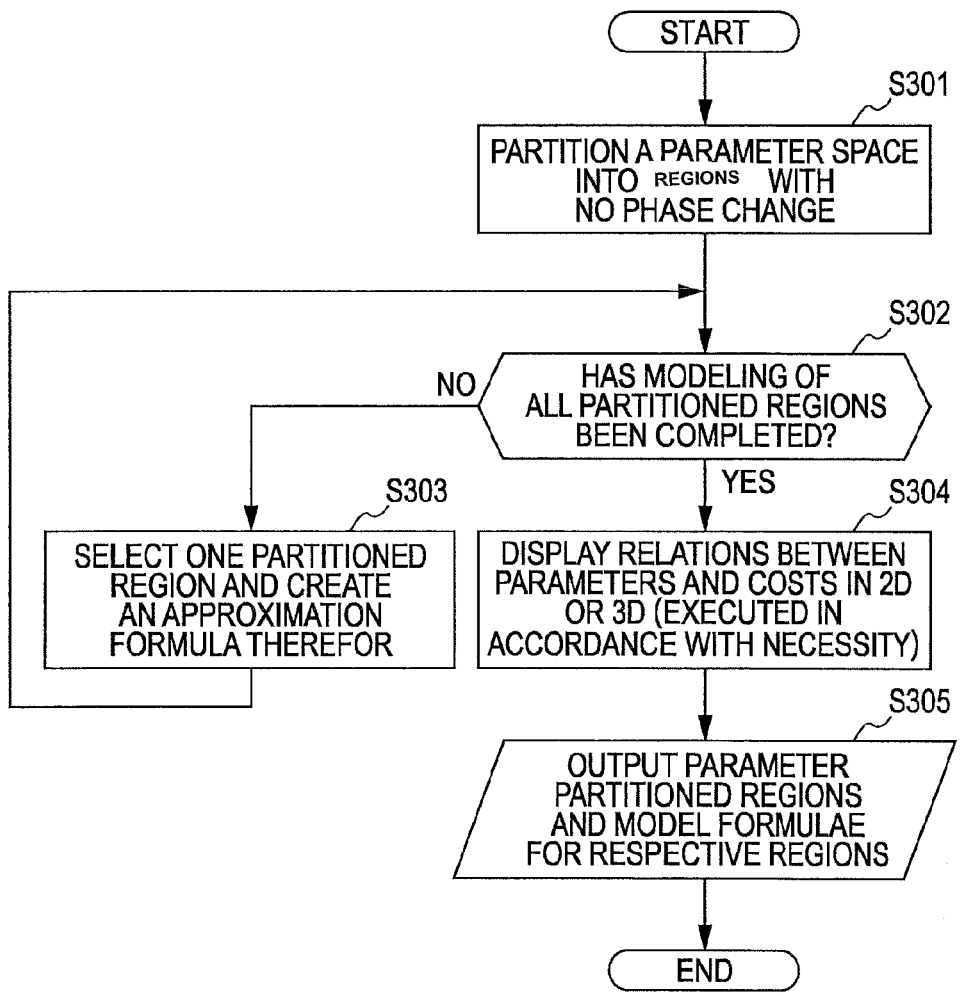
FIG. 3 is an operational flowchart showing an overall operation of an embodiment according to the present invention.

On the basis of such knowledge described above, in this embodiment, operations shown in an operational flowchart of FIG. 3 are performed in the configuration shown in FIG. 1.

Firstly, in the parameter/range-data storing section 102, as design specifications with respect to the scope of searching for the shape of a slider, sample groups associated with around several hundred parameters related to the shape and range-data thereof are stored. Concurrently with this operation, in the initial shape data storing section 101, as initial shape data corresponding to these sample groups, sets of coordinate data related to vertexes of the shapes of individual blocks forming the slider are stored.

Further, the parameter-space partitioning section 103 partitions a parameter space into regions, in each of which a phase of the shape of the slider does not change, on the basis of the foregoing sample groups associated with parameters and range data thereof and the initial shape data (step S301 shown in FIG. 3).

Secondary, the region-by-region modeling section 104 shown in FIG. 1 selects regions obtained by partitioning made during step S301 one by one. The region-by-region modeling section 104 reads out sample groups associated with parameters and range-data thereof, which belong to the selected region, from the parameter/range-data storing section 102, and for the read-out sample groups, executes a simulation calculation, and then, outputs the values of the individual objective functions. Thirdly, the region-by-region modeling section 104 executes a regression analysis for data files including sample groups associated with parameters and the values of individual objective functions calculated for respective sample groups associated with parameters. By performing such processing, the region-by-region modeling section 104 approximates the individual objective functions associated with the shape of a slider, corresponding to respective partitioned regions, by using objective-function approximation formulae (step S303 shown in FIG. 3). The region-by-region modeling section 104 iteratively performs this processing until the modeling for all of the partitioned regions has been completed (iterative processes performed during steps S302→S303→S302 shown in FIG. 3).

In addition, the model simplifying section 105 simplifies the objective-function approximation formulae, which were obtained by the region-by-region modeling section 104, by deleting parameters each having a low degree of contribution to the approximation of objective functions.

The objective-function approximating formulae obtained in such a way as described above, and range-information related to parameters for individual partitioned regions, which were obtained by the parameter-space partitioning section 103, are stored in the output data storing section 106.

In such a way described above, in this embodiment, it is possible to optimally perform modeling of objective functions in a way adapted to the shape of a slider.

The relation-between-parameter-and-objective-function displaying section 107 shown in FIG. 1 is invoked in accordance with necessity. The relation-between-parameter-and-objective-function displaying section 107 calculates the values of the objective functions (cost) corresponding to respective groups of parameters, on the basis of range-information related to parameters and objective-function approximation formulae for respective partitioned regions stored in the output data storing section 106. Further, the relation-between-parameter-and-objective-function displaying section 107 displays individual parameters and users' selected one or two objective function(s), and mutual relations among objective functions, on a display or the like in two dimensions (2D) or three dimensions (3D) (step S304 shown in FIG. 3).

The parameter-range/approximation-formula outputting section 108 outputs range information related to parameters and objective-function approximation formulae for respective partitioned regions in a format of files or the like (step S305 shown in FIG. 3).

Figure 4:
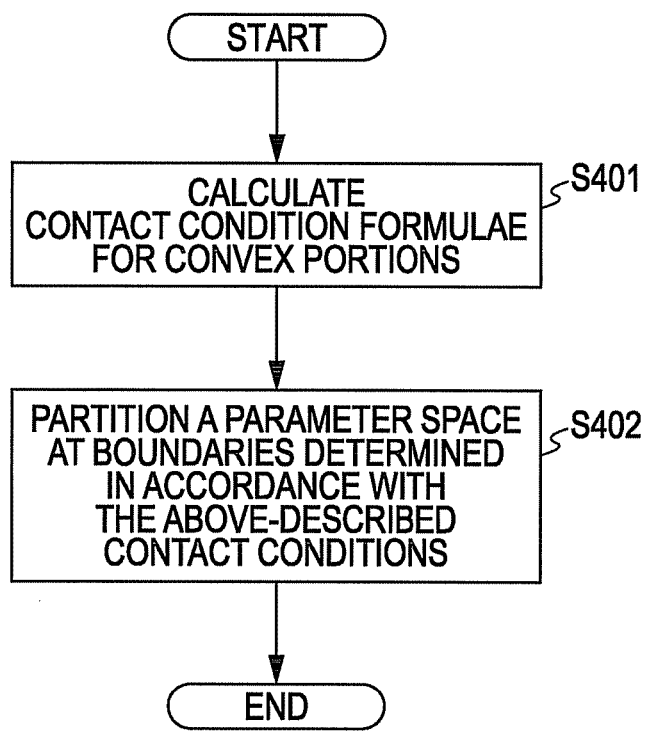
FIG. 4 is an operational flowchart (No. 1) showing the details of processing for partitioning a parameter space into regions each having no phase change arising therein.
Figure 5:
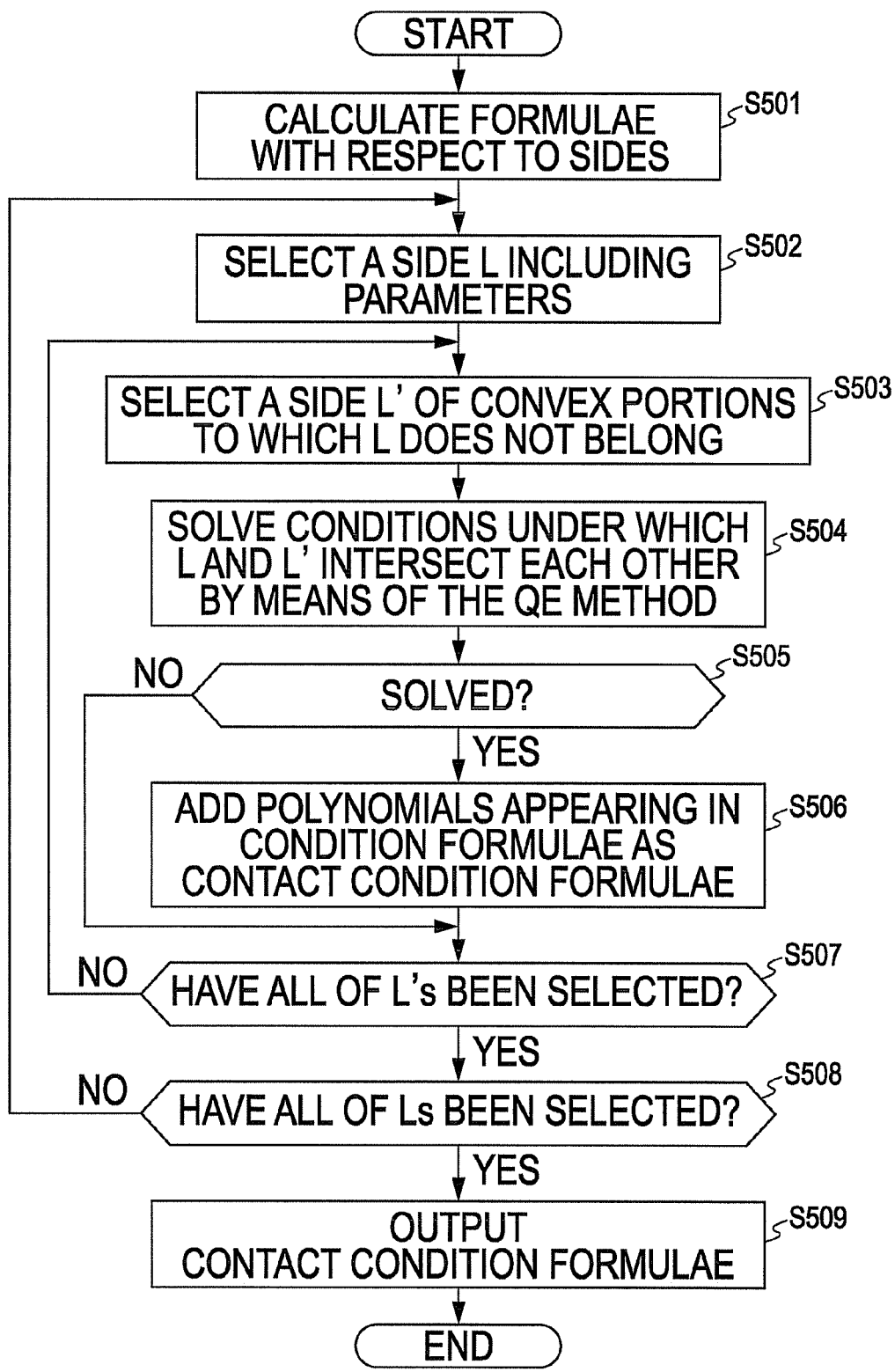
FIG. 5 is an operational flowchart (No. 2) showing the details of processing for partitioning a parameter space into regions each having no phase change arising therein.

FIGS. 4 and 5 are operational flowcharts illustrating details of processing for partitioning a parameter space into regions having no phase change arising therein.

As shown in FIG. 4, firstly, from parameters associated with the shape of a slider and their moving ranges, which are set by designers, the parameter-space partitioning section 103 derives contact-condition formulae, each being a relational formula representing relations among parameters when convex portions of the shape of a slider contact with each other (step S401 shown in FIG. 4)

Next, the parameter-space partitioning section 103 partitions a parameter space at boundaries, at which convex portions of the shape of a slider contact with each other, by using the contact-condition formulae derived during step S401 (step 402 shown in FIG. 4).

FIG. 5 is an operational flowchart illustrating details of processing for deriving contact-condition formulae with respect to convex portions, the processing being performed during step S401 shown in FIG. 4.

Firstly, the parameter-space partitioning section 103 calculates formulae with respect to sides of individual convex portions of the shape of a slider (step S501 shown in FIG. 5). The individual convex portions of the shape of the slider are, for example, individual regions denoted by A, B and C shown in FIG. 8. With respect to sides forming each of the convex portions, pieces of vertex coordinate data, each indicating the location of a vertex of the sides in accordance with an order in which the sides are arranged, are stored in the initial shape data storing section 101. Once calculations with respect to a line segment connecting vertexes neighboring each other are performed, a formula corresponding to one side of the convex portions can be obtained. In addition, it is to be noted that, with respect to a side including at least one vertex which is selected as a parameter, the obtained formula is a formula including the parameter. The parameter-space partitioning section 103 calculates formulae with respect to all of the sides, and stores the calculated results therein as pieces of data related to the sides. The following is an example of a configuration of a piece of data related to a side.

Pieces of vertex coordinate data related to vertexes neighboring each other: (0.01, 0.02) (0.2, 0.05)
A piece of data related to a side: y=3*x+0.01, 0.01≤x≤0.02

In addition, the shape of a slider is represented by three dimensional information including depth, however, when considering problems associated with a contact, just taking into consideration parameters related to a planer shape is sufficient.

Next, the parameter-space partitioning section 103 selects a side L having the corresponding formula including at least one parameter, for which contact conditions have not yet been investigated, from among the pieces of data related to sides for which the formulae were obtained during step S501 (step S502 shown in FIG. 5).

Next, the parameter-space partitioning section 103 selects a side L' of a convex portion to which the side L does not belong from among the pieces of data related to sides for which the formulae were obtained during step S501 (step S503 shown in FIG. 5).

Next, the parameter-space partitioning section 103 solves conditions under which the side L and the side L' intersect each other by using the quantifier elimination (QE) method (step S504 shown in FIG. 5). The details of the QE method is omitted from this description, but a processing method thereof is disclosed in a publicly known document, Anai Hirokazu and Yokoyama Kazuhiro, "Outline of CAD and QE", Mathematic Seminar, vol. 11, P. 64-70, 2007, and in this embodiment, the processing method is used as it is.

The parameter-space partitioning section 103 determines whether the conditions under which the sides L and L' intersect each other have been successfully solved, or not (step S506 shown in FIG. 5).

In the case where the determination made during step S505 is NO, no further processing will be performed. In the case where the determination made during step S505 is YES, since condition formulae related to parameters can be obtained, polynomials appearing in the condition formulae are added as contact condition formulae (step S506 shown in FIG. 5).

Subsequently, the parameter-space partitioning section 103 determines whether all of the sides L's of convex portions to which the side L does not belong have been completely selected, or not (step S507 shown in FIG. 5).

In the case where the determination made during step S507 is NO, the parameter-space partitioning section 103 returns the flow to the processing performed during step S503, and then, iteratively executes processes of solving the contact condition formulae during steps S504 to S506 with respect to a different side L' of convex portions to which the side L does not belong.

In the case where all of the sides L's of convex portions to which the side L does not belong have been completely selected and the determination made during step S507 is YES, the parameter-space partitioning section 103 outputs all contact condition formulae and terminates the processing performed during step S401.

Processing to be performed by the parameter-space partitioning section 103 during step S402 shown in FIG. 4 subsequent to the processing performed during step S401 shown in FIG. 4 will be hereinafter described.

As described above, here, the parameter-space partitioning section 103 partitions the parameter space at boundaries, at which convex portions of the shape of the slider contact one another, by using contact condition formulae obtained during step S401.

Figure 8:
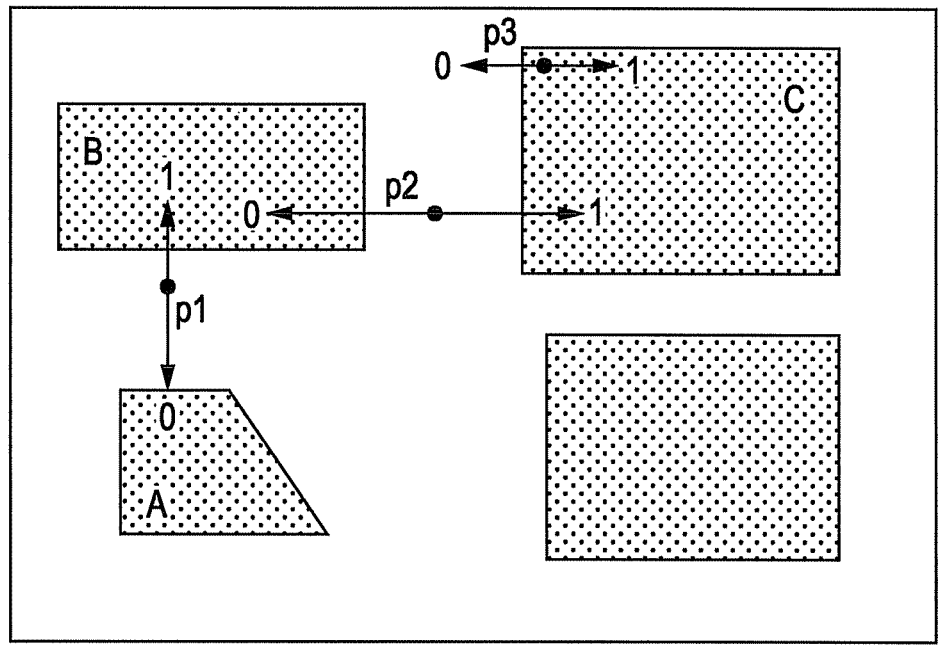
FIG. 8 is a description diagram (No. 1) illustrating operations of processing for partitioning a parameter space.

Now, let us assume that, as shown in FIG. 8, there are three convex portions A, B and C with respect to the shape of a slider, and further, parameters are p1, p2 and p3. In this case, by performing the foregoing processing during step S504, the following contact condition formulae can be obtained.

A contact condition between A and B: p1=0.7
A contact condition between B and C: p3=5*p2−3

In this case, a condition which allows the portions A, B and C not to be combined but to be partitioned into three regions is shown as follows:

$$\{(p1,p2,p3)|p1<0.7 \text{ and } p3>5*p2-3\}$$

For example, in the case where p1=0, p2=0.3, p3=0.4, the above-described condition formula is satisfied, and thus, as shown in FIG. 8, the portions A, B and C are not combined into one region, but are partitioned into three regions. In contrast, a condition which allows the portions A, B and C to be combined into one region is shown as follows:

$$\{(p1,p2,p3)|p1 \geq 0.7 \text{ and } p3 \leq 5*p2-3\}$$

Figure 9:
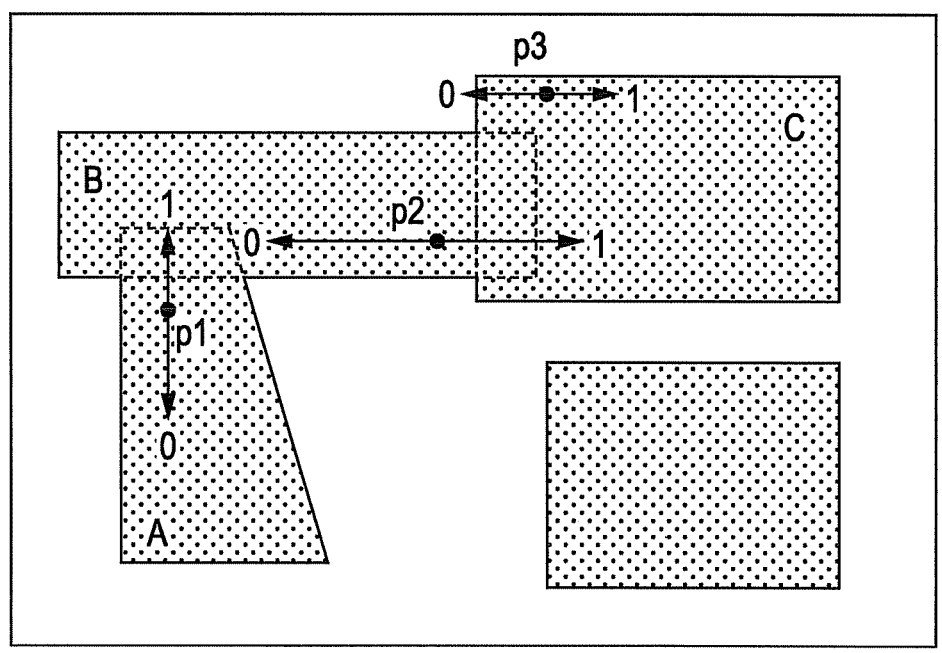
FIG. 9 is a description diagram (No. 2) illustrating operations of processing for partitioning a parameter space.

For example, in the case where p1=1, p2=0.8, p3=0.1, the above-described formula is satisfied, and thus, as shown in FIG. 9, the portions A, B and C are combined into one region.

Figure 10:
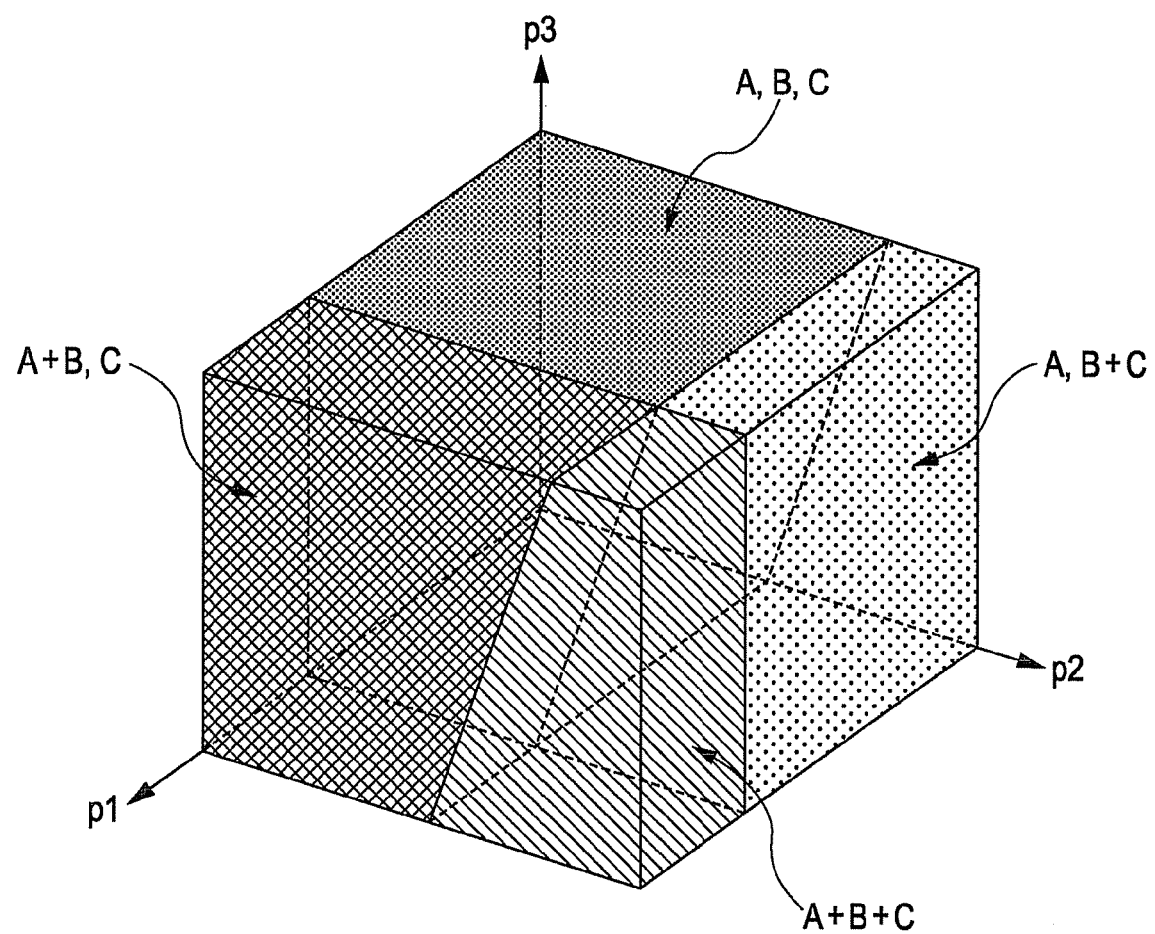
FIG. 10 is a description diagram (No. 3) illustrating operations of processing for partitioning a parameter space.

In accordance with these relations, as shown in FIG. 10, the parameter space can be partitioned by using equality formulae and inequality formulae representing relations among parameters.

The parameter-space partitioning section 103 executes processing for partitioning a parameter space into regions each having no phase change arising therein during step S301 shown in FIG. 3, as processing corresponding to the foregoing detailed processes performed during steps S401 and S402 shown in FIG. 4.

Figure 6:
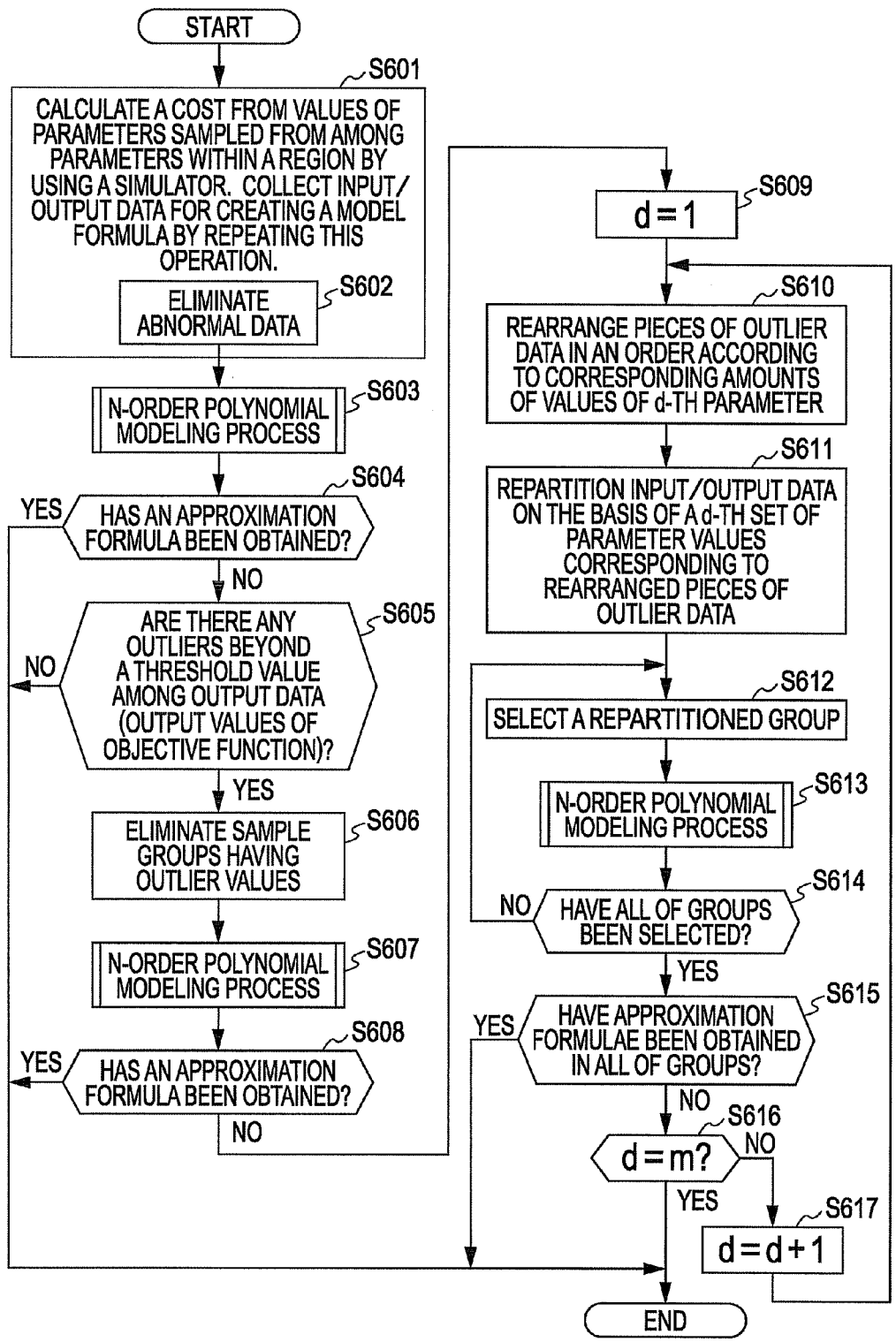
FIG. 6 is an operational flowchart showing the details of processing for creating approximation formulae for respective partitioned regions.

FIG. 6 is an operational flowchart illustrating details of operations of processing for creating approximation formulae for respective partitioned regions, as processing corresponding to processing performed by the region-by-region modeling section 104 shown in FIG. 1 during step S303 shown in FIG. 3.

Firstly, the region-by-region modeling section 104 selects one of regions partitioned during step S301 shown in FIG. 3. Secondly, the region-by-region modeling section 104 reads out sample groups associated with parameters belonging to the selected partitioned region and range data thereof from the parameter/range-data storing section 102. Here, for example, partitioned regions shown in FIG. 10 are expressed by using equality formulae and inequality formulae representing relations among parameters. Therefore, it is sufficient for the region-by-region modeling section 104 to, on the basis of theses formulae, just read out sample groups of parameters belonging to the selected region and range-data thereof from parameter/range-data storing section 102. Subsequently, the region-by-region modeling section 104 executes flying simulation calculations with respect to a slider for respective read-out sample groups, and outputs individual objective functions. In this way, input/output data used for creating the model formulae is collected (processes described hereinbefore are those performed during step S601 shown in FIG. 6).

Figure 11:
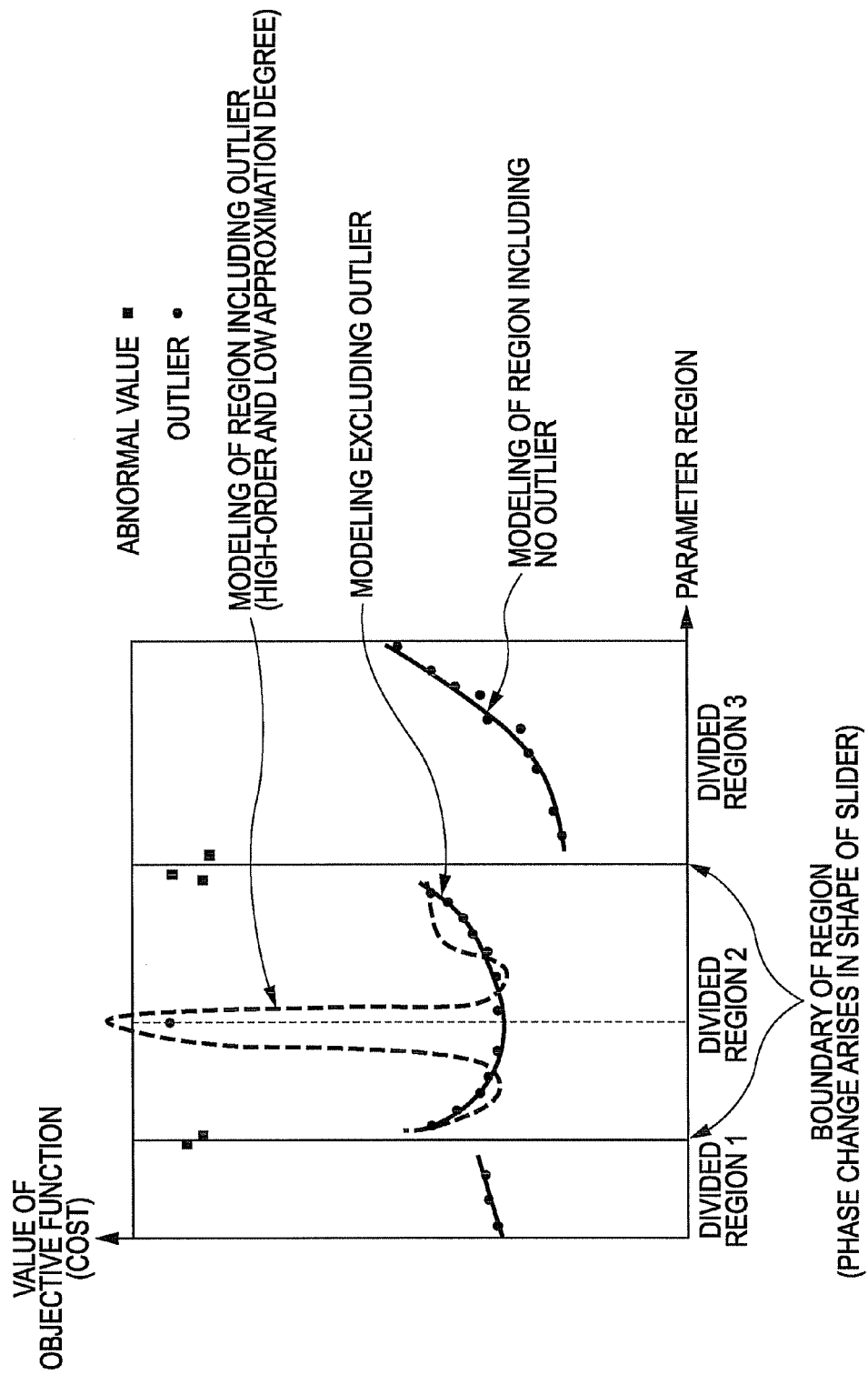
FIG. 11 is a description diagram illustrating operations of processing for abnormal values and outliers.

In processes of collecting input/output data used for creating the model formulae, performed during the foregoing step S601, the region-by-region modeling section 104 eliminates pieces of data each having an abnormal value (step S602 shown in FIG. 6). Here, among pieces of input/output data used for creating the model formulae, pieces of input/output data including values of parameters which are equal to values of portions close to boundaries of the partitioned regions, the boundaries being located around the boundaries of the phase of the shape of the slider, are likely to cause the individual objective functions to each output an abnormally large amount of value. In this embodiment, such a piece of input/output data is defined as an abnormal value. Further, even in the case where the values of the parameters are not equal to values of portions close to boundaries of the regions, the parameters possibly cause the individual objective functions to each output an abnormally large amount of value. Such a piece of input/output data is defined as an outlier. FIG. 11 is a diagram illustrating a condition of occurrence of abnormal values and outliers. The abnormal value significantly affects the modeling operations, and thus, is firstly eliminated. The outlier possibly raises the order of modeling, and thus, is eliminated in the case where the modeling using an appropriate modeling order does not go well.

Therefore, during step S602, firstly, in order to eliminate abnormal values, the region-by-region modeling section 104 adopts one of the following methods.

A first method is such that the region-by-region modeling section 104 makes a decision in which, among read-out sample groups of parameters, sample groups including values of parameters, which are equal to values of portions close to boundaries of the partitioned regions, are likely to take abnormal values, and thus, operates so as not to select such sample groups from commencement of processing to be performed during step S601. A reference distance value, which is used for determination as to whether the values of parameters are equal to values of portions close to boundaries of partitioned regions, or not, can be set in advance by users. Alternatively, a default value may be used as the reference distance value.

A second method is such that, firstly, the region-by-region modeling section 104 executes processing to be performed during step S601. Further, among the resultant collected input/output data used for creating model formulae, the region-by-region modeling section 104 eliminates pieces of input/output data as abnormal values, corresponding to sample groups including values of parameters which are equal to values of portions close to boundaries of the partitioned regions, and further, having values of the individual objective functions resulting from calculations using the corresponding sample groups, the values of the individual objective functions being greater than a predetermined threshold value. In this case, the predetermined threshold value can be set in advance by users. Alternatively, a default value may be used as the predetermined threshold value.

By using the input/output data used for creating model formulae, which was collected concurrently with elimination of the outliers performed in such a way as described, the region-by-region modeling section 104 executes N-order polynomial modeling processing (step S603 shown in FIG. 6). Here, firstly, a required approximation degree A and a maximum modeling order limitation number M are specified by users. In the case where these are not specified, default values are used. Further, by using the foregoing input/output data, within a range satisfying the conditions of the required approximation degree A and the maximum modeling order limitation number M, objective-function approximation formulae are created so as to each have an order as low as possible.

Figure 7:
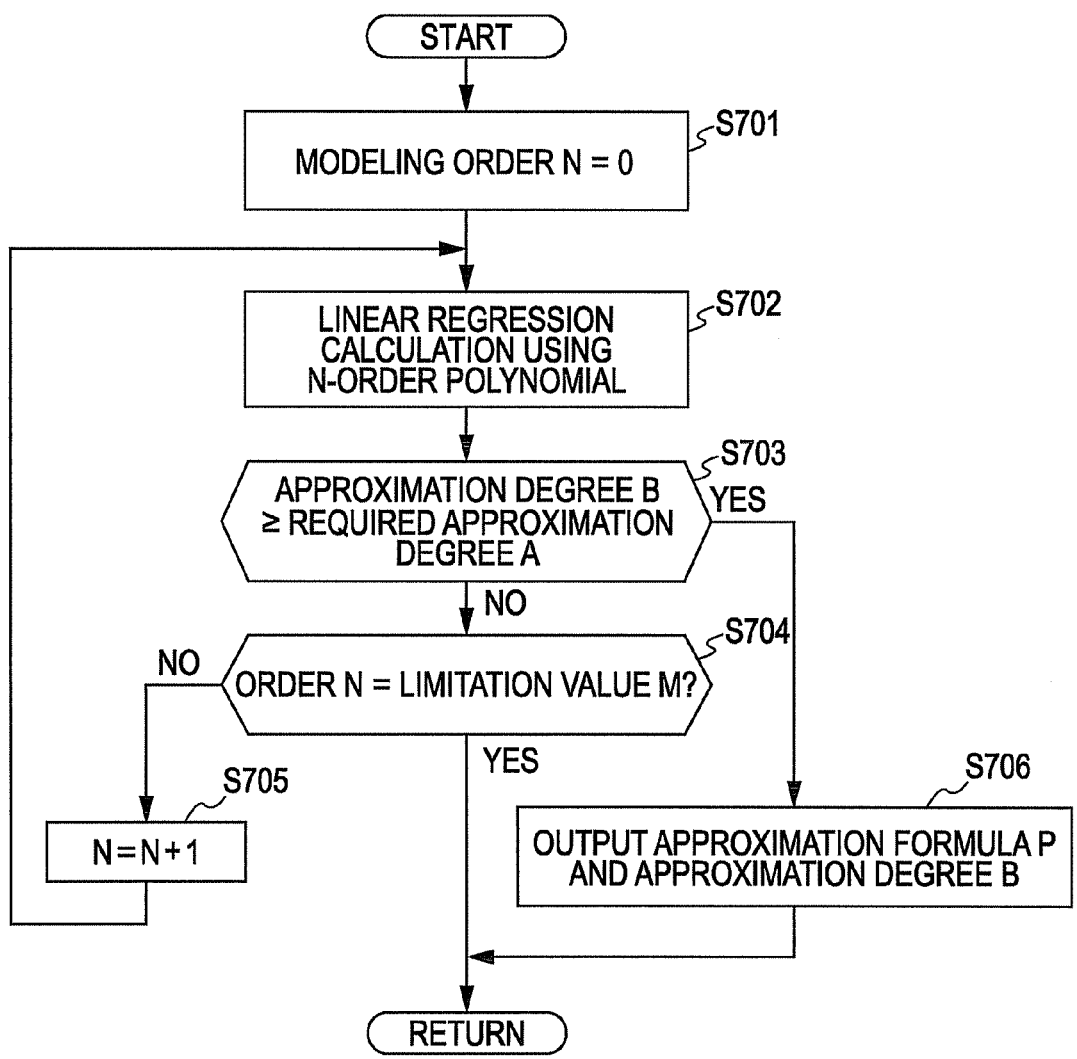
FIG. 7 is an operational flowchart showing the details of processing for N-order polynomial modeling.

FIG. 7 is an operational flowchart illustrating details of operations of N-order polynomial modeling processing.

Firstly, the region-by-region modeling section 104 sets an order N of the modeling to "0" (step S701 shown in FIG. 7)

Next, the region-by-region modeling section 104 executes linear regression calculations by using input/output data, and approximates individual objective functions by using the resultant objective-function approximation formulae created on the basis of parameters (step S702 shown in FIG. 7). As a result of this, in addition to the approximation formulae, an approximation degree B indicating a fitting index using a coefficient of determination (R-square) is calculated.

Subsequently, the region-by-region modeling section 104 determines whether the approximation degree B obtained during step S702 is larger than or equal to the required approximation degree A, or not (step S703 shown in FIG. 7).

In the case where sufficient approximation is achieved by the approximation formula and the determination made during step S703 is YES, the region-by-region modeling section 104 outputs the approximation formula and the approximation degree B calculated during step S702 to the output data storing section 106 (step S706 shown in FIG. 7). Further, the region-by-region modeling section 104 terminates the N-order polynomial modeling processing. In conjunction with this processing, the parameter-space partitioning section 103 shown in FIG. 1 outputs range information with respect to parameters of a partitioned region, which is presently selected by the region-by-region modeling section 104, to the output data storing section 106.

In the case where sufficient approximation is not achieved by the approximation formula and the determination made during step S703 is NO, the region-by-region modeling section 104 determines whether the present modeling order N has come to the maximum modeling order limitation number M, or not. (step S704 shown in FIG. 7).

In the case where the present modeling order N has not yet come to the maximum modeling order limitation number M and the determination made during step 704 is NO, the region-by-region modeling section 104 increments the modeling order N by one (step S705 shown in FIG. 7). Further, the region-by-region modeling section 104 returns control of processing to the processes of step S702, and iteratively executes a series of calculations for polynomial approximation modeling using a modeling order N, which is one order higher than that for an immediately previously executed series of calculations for polynomial approximation modeling.

In the case where the present modeling order N has already come to the maximum modeling order limitation number M and the determination made during step 704 is YES, the N-order polynomial modeling processing is terminated under the condition where the approximation formula cannot be obtained.

In such a way as described above, the region-by-region modeling section 104 executes the N-order polynomial modeling processing.

Next, the region-by-region modeling section 104 determines whether an approximation formula has been successfully obtained during step S603, or not (step S604 shown in FIG. 6).

In the case where the approximation formula has been successfully obtained and the determination made during step S604 is YES, the region-by-region modeling section 104 terminates one series of processes performed during step S303 shown in FIG. 3 for a selected partitioned region. The region-by-region modeling section 104 iteratively executes this modeling processing for each partitioned region until the modeling for all of the partitioned regions has been completed (iterative processes performed during steps S302→S303→S302 shown in FIG. 3).

In contrast, In the case where the approximation formula has not yet been obtained and the determination made during step S604 is NO, subsequently, the region-by-region modeling section 104 executes processing for outliers, which includes a series of processes to be performed during steps S605 to S617 shown in FIG. 6.

Firstly, the region-by-region modeling section 104 determines whether, among input/output data used for creating model formulae, having been collected during step S601, at least one outlier, which is a value of an objective function exceeding a predetermined value, exists, or not (step S605 shown in FIG. 6).

In the case where no outlier exists, the region-by-region modeling section 104 makes a decision in which, with respect to a presently selected partitioned region, it is impossible to perform modeling appropriately, and terminates one series of processes performed during step S303 shown in FIG. 3 for the partitioned region.

In contrast, in the case where at least one outlier exists, from among the input/output data used for creating the model formula, having been collected during step S601, the region-by-region modeling section 104 eliminates pieces of input/output data corresponding to sample groups each including such an outlier (step S606 shown in FIG. 6).

Further thereto, by using remaining input/output data, the region-by-region modeling section 104 executes the N-order polynomial modeling processing once again (step S607 shown in FIG. 6). The details of this processing are shown in the foregoing operational flowchart of FIG. 7.

As a result of the foregoing N-order polynomial modeling processing performed once again, the region-by-region modeling section 104 determines whether an approximation formula has been successfully obtained, or not (step S608 shown in FIG. 6).

In the case where the approximation formula has been successfully obtained and the determination made during step S608 is YES, the region-by-region modeling section 104 terminates one series of processes for a selected partitioned region, performed during step S303 shown in FIG. 3.

In contrast, in the case where, even during step S607, the approximation formula has not been successfully obtained and the determination made during step S608 is NO, during a series of steps S609 to S617 shown in FIG. 6, the region-by-region modeling section 104 performs modeling by partitioning the parameter region so that parameter values corresponding to respective outliers become boundaries of the parameter region.

Here, let us assume that the parameters are expressed by: $(P\_1, \ldots, P\_m)$. That is, the number of kinds of the parameters is m. Further, let us assume that the number of outliers is w. Moreover, let us assume that pieces of outlier data are expressed by: $(p\_i\_1, \ldots, p\_i\_m, c\_i\_1, \ldots, c\_i\_n)$ ($i = 1, \ldots, w$).

Firstly, the region-by-region modeling section 104 sets a value of a parameter-kind indicating variable d to "1", which functions so as to select one of the kinds of parameters (step S609 shown in FIG. 6).

Secondly, the region-by-region modeling section 104 rearranges pieces of outlier data in an order according to smallness of each of the corresponding parameter values associated with a d-th parameter P_d (step S610 shown in FIG. 6). Here, let us represent a set of parameter values associated with the d-th parameter, corresponding to respective pieces of rearranged outlier data, by $u\_1, \ldots, u\_w$.

Thirdly, the region-by-region modeling section 104 compares pieces of input/output data associated with the d-th parameter, having been collected during step S601, with respective parameter values out of the set of w pieces of parameter values $u\_1, \ldots, u\_w$ associated with the d-th parameter, corresponding to respective rearranged pieces of outlier data. In this way, the region-by-region modeling section 104 repartitions the pieces of input/output data into (w+1) pieces of groups. That is, assuming that a parameter value corresponding to each of the pieces of input/output data is v, repartitioning can be achieved by performing the following comparison processing:

If $v<u\_1$, then, the piece of input/output data is sorted into G_0.

If $u\_1 \leq v < u\_2$, then, the piece of input/output data is sorted into G_1.

If $u\_(w-1) \leq v < u\_w$, then, the piece of input/output data is sorted into G_(w-1).

If $u\_w < v$, then, the piece of input/output data is sorted into G_w.

For example, a description of the foregoing comparison processing by way of an example shown in FIG. 11 is such that, pieces of input/output data belonging to a partitioned region 2 are repartitioned into two groups by a parameter value on a horizontal axis, which corresponds to a outlier denoted by a dot "●".

Subsequently, the region-by-region modeling section 104 selects one of the repartitioned groups (step S612 shown in FIG. 6).

Further, by using pieces of input/output data belonging to the selected repartitioned group, the region-by-region modeling section 104 executes the N-order polynomial modeling processing once again (step S613 shown in FIG. 6). The details of this processing is shown in the foregoing operational flowchart shown in FIG. 7.

The region-by-region modeling section 104 executes this N-order polynomial modeling processing until all of the repartitioned groups have been completely selected (iterative processes performed during steps S614→S612→S613→S614 shown in FIG. 6).

In the case where all of the repartitioned groups have been completely selected and the determination made during step S614 is YES, the region-by-region modeling section 104 determines whether, with respect to all of the selected repartitioned groups, approximation formulae have been successfully obtained, or not (step S615 shown in FIG. 6).

In the case where approximation formulae have been successfully obtained with respect to all of the selected repartitioned groups and the determination made during step S615 is YES, the region-by-region modeling section 104 terminates one series of processes performed during step S303 shown in FIG. 3.

In contrast, in the case where approximation formulae have not been obtained with respect to all of the selected repartitioned groups and the determination made during step S615 is NO, the region-by-region modeling section 104 determines whether the number of the parameter-kind indicating variable d has come to the number of kinds of parameters m, or not (step S616 shown in FIG. 6).

In the case where the number of the parameter-kind indicating variable d does not come to the number of kinds of parameters m and the determination made during step S616 is NO, the region-by-region modeling section 104 increments the parameter-kind indicating variable d by one (step S617 shown in FIG. 6). Further, the region-by-region modeling section 104 returns control of processing to the processing to be performed during step S610. Further, with respect to a subsequent parameter-kind indicating variable, the region-by-region modeling section 104 iteratively executes processing of modeling in conjunction with repartitioning pieces of input/output data into (w+1) pieces of groups on the basis of a set of parameter values associated with the d-th parameter, the set of parameter values corresponding to respective pieces of rearranged outlier data.

In the case where the number of the parameter-kind indicating variable d has come to the number of kinds of parameters m and the determination made during step S616 is YES, the region-by-region modeling section 104 makes a decision in which, with respect to a presently selected partitioned region, it is impossible to perform modeling appropriately, and terminates one series of processes performed during step S303 for the partitioned region.

As described above, according to this embodiment, it is possible to partition a parameter space so as to raise the precision of modeling prior to performing a simulation calculation which incurs a high cost, and efficiently create an approximation model for each of the partitioned regions without increasing the number of sample groups. Further, by performing processing for eliminating abnormal values, and performing processing for eliminating outliers or processing for repartitioning on the basis of outliers, it is possible to create an approximation model of an order as low as possible and a higher precision.

Furthermore, according to this embodiment, on the basis of an approximation model formula obtained in such a way as described above, it is possible to display one or two objective function(s), mutual relations between objective functions, and particularly, behaviors around Pareto boundaries, which are selected by individual parameters and operations of users, in a high-speed and precise operation to a significantly greater degree than in existing systems. Furthermore, it is possible to feed back knowledge with respect to a design of the shape of a slider to designers.

Figure 12:
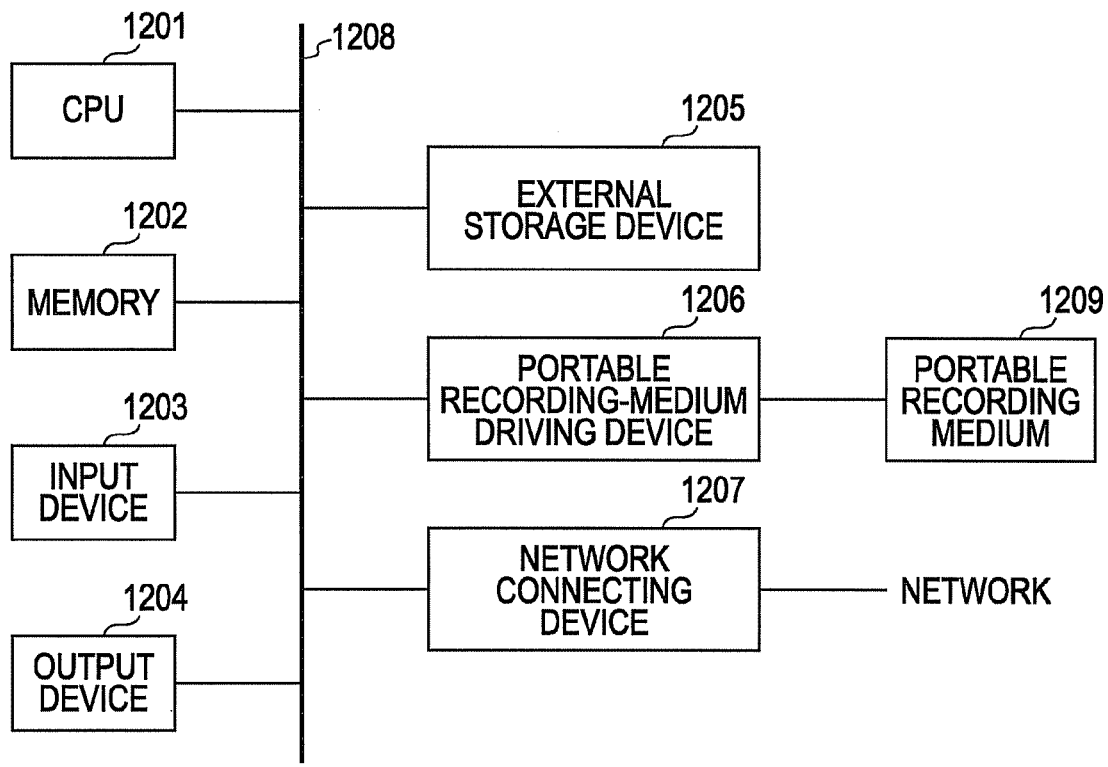
FIG. 12 is a diagram illustrating an example of a hardware configuration of a design support apparatus which enables realization of a system according to an embodiment of the present invention.
Figure 13:
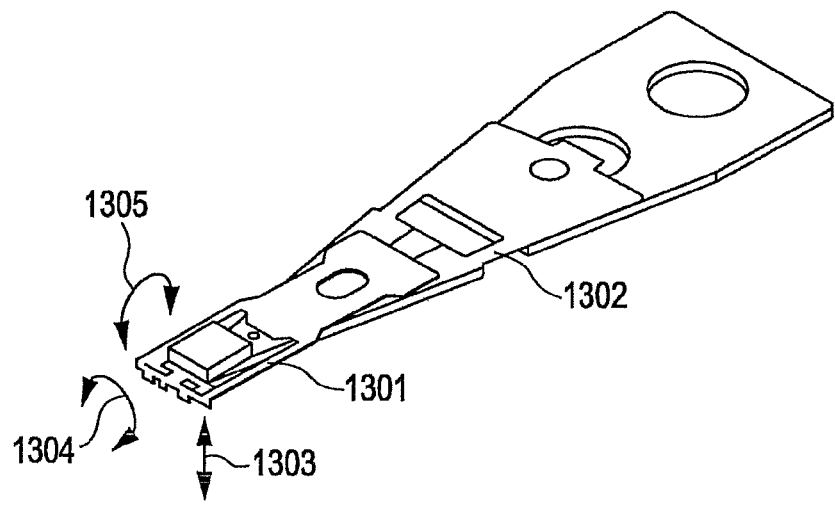
FIG. 13 is a description diagram illustrating a slider of a hard disk.
Figure 14:
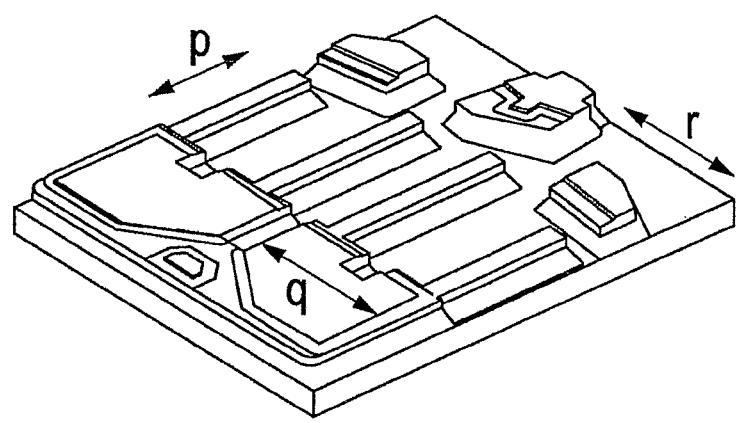
FIG. 14 is a description diagram illustrating parameters of a shape of a slider.
Figure 15:
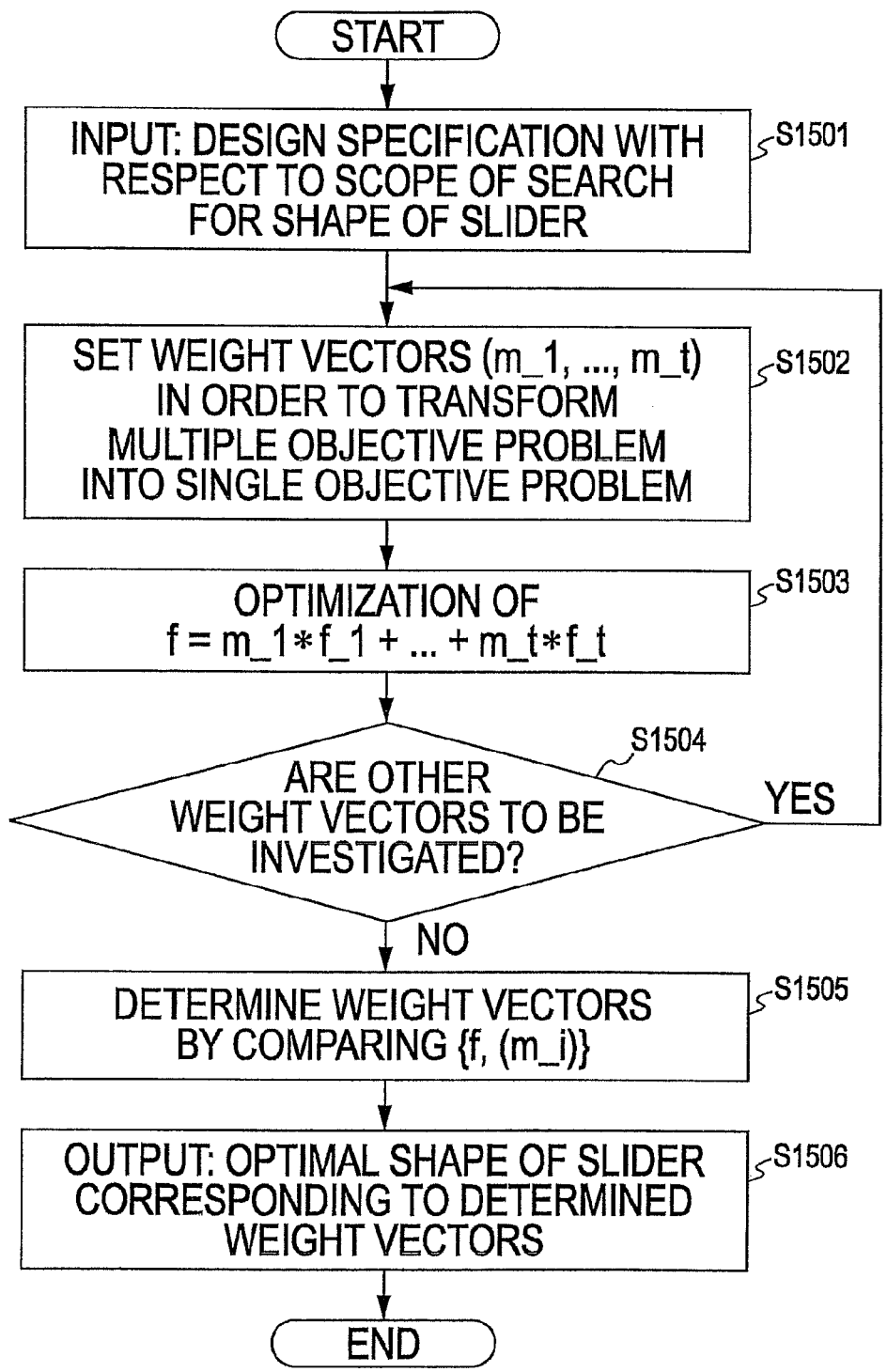
FIG. 15 is an operational flowchart of operations according to an existing technology.

FIG. 12 is a diagram illustrating an example of a hardware configuration of a design support apparatus which enables realization of the foregoing system.

A design support apparatus shown in FIG. 12 includes a CPU 1201, a memory 1202, an input device 1203, an output device 1204, an external storage device 1205, a portable recording-medium driving device 1206 having a portable recording medium 1209 inserted thereinto, and a network connection device 1207, and is configured to allow these devices to be connected one another via a bus 1208. The configuration shown in FIG. 12 is just an example of a design support apparatus which enables realization of the foregoing system, and such a design support apparatus is not limited to this configuration. The design support apparatus determines a plurality of objective functions for modeling an object. The object have a plurality of elements, each of the elements providing variable geometrical parameters The CPU (processor) 1201 performs control of the whole of the design support apparatus. The memory 1202 is a memory chip, such as a RAM chip, in which, modules of programs and blocks of data stored in the external storage device 1205 (or the portable storage medium 1209) are temporarily stored. The CPU 1201 reads out and writes the modules of programs into the memory 1202, and by executing the modules of programs, the CPU 1201 performs control of the whole of the system. The memory 1202 stores the variable geometrical parameters. The CPU 1201 executes a process. The process includes determining boundary information associated with specified geometrical parameters of the elements which indicate a state of contact between the elements, dividing the variable geometrical parameters into a plurality of groups on the basis of the boundary information, and determining the plurality of objective functions for each of the groups by using the variable geometrical parameters.

The input device 1203 includes, for example, a keyboard, a mouse and the like, and interface control devices therefor. The input device 1203 detects input operations from the mouse, the keyboard and the like performed by users, and notifies the CPU 1202 of the detected results.

The output device 1204 includes a display device, a printing device and the like, and interface control devices therefor. The output device 1204 outputs pieces of data, which are transmitted in accordance with control performed by the CPU 1201, to the display device and the printing device.

The external storage device 1205 is, for example, a hard disk storage device. This external storage device 1205 is mainly used for the storage of various kinds of data and modules of programs.

The portable recording-medium driving device 1206 is a device configured to contain the portable recording medium 1209, such as an optical disk, an SDRAM, a compact flash memory or the like, and has a roll of supplementing the external storage device 1205.

The network connection device 1207 is a device configured to connect the design support apparatus to a communication line, such as a LAN (a local area network) or a WAN (a wide area network).

A system according to this embodiment is realized by causing the CPU 1201 to execute modules of programs including the individual processing blocks shown in FIG. 1. The modules of programs may be distributed by means of, for example, the external storage device 1205 or the portable recording medium 1209 including the modules of programs recorded therein, or be configured to be acquirable from networks via the network connection device 1207.

The technologies disclosed hereinbefore are shown as technologies implemented in an embodiment of a design supporting apparatus configured to support the design of a slider included in a hard disk, but can be applied to other apparatuses performing design support, concurrently with performing multi-objective optimization.

With respect to the foregoing embodiment, the following appendixes are further disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:
1. A design support apparatus comprising:
a memory configured to store variable geometrical parameters for determining a shape of an object having a plurality of elements; and
a processor configured to execute a process for determining a plurality of objective functions using the variable geometrical parameters of the object, the process including:

determining boundary information associated with specified geometrical parameters of the elements which indicate a state of contact between the elements, dividing the variable geometrical parameters into a plurality of groups based on the boundary information, eliminating the variable geometrical parameters located around boundaries from each of the plurality of groups generated by a completion of the dividing, and determining an objective function having a minimum order each of the plurality of groups by an N-order polynomial modeling processing using the variable geometrical parameters which are included in each of the plurality of groups generated by the completion of the dividing and are subjected to an operation of eliminating the variable geometrical parameters located around boundaries from each of the plurality of groups as potential abnormal values.

2. The design support apparatus according to claim 1, wherein the variable geometrical parameters include coordinate data related to vertexes of shapes of the elements.

3. The design support apparatus according to claim 2, wherein the process includes:

determining line connecting the vertexes neighboring each other, and determining the state of contact between the elements based on a condition under which the lines intersect each other.

4. The design support apparatus according to claim 1, wherein the process includes eliminating values of the plurality of objective functions corresponding a group, where an eliminating value is greater than a predetermined value.

5. The design support apparatus according to claim 4, wherein the process includes dividing the variable geometrical parameters into a plurality of groups based on the eliminated values.

6. The design support apparatus according to claim 1, which the minimum order is determined based on an approximation degree and a maximum modeling order limitation.

7. A method to determine a plurality of objective functions for modeling an object having a plurality of elements, each of the elements providing variable geometrical parameters, the method comprising:

determining, by a processor included in a design support apparatus including a memory storing the variable geometrical parameters for determining a shape of an object, boundary information associated with specified geometrical parameters of elements which indicate a state of contact between the elements;

dividing, by a processor, the variable geometrical parameters into a plurality of groups based on the boundary information;

eliminating the variable geometrical parameters located around boundaries from each of the plurality of groups generated by a completion of the dividing; and determining, by a processor, an objective function having a minimum order for each of the plurality of groups by an N-order polynomial modeling processing using the variable geometrical parameters which are included in each of the groups generated by a completion of the dividing and are subjected to an operation of eliminating the variable geometrical parameters located around boundaries from each of the plurality of groups as potential abnormal values.

8. The method according to claim 7, wherein the variable geometrical parameters includes coordinate data related to vertexes of shapes of the elements, and the method comprising:

determining line connecting the vertexes neighboring each other, and determining the state of contact between the elements based on a condition under which the lines intersect each other.

9. The method according to claim 7, comprising eliminating values of the plurality of objective functions corresponding a group, where an eliminating value is greater than a predetermined value.

10. The method according to claim 9, comprising dividing the variable geometrical parameters into a plurality of groups on based on the eliminated values.

11. The method according to claim 7, which the minimum order is determined based on an approximation degree and a maximum modeling order limitation.

12. A non-transitory computer readable medium storing a program controlling a design support apparatus to determine a plurality of objective functions using variable geometrical parameters for determining a shape of an object, the design support apparatus including a memory to store the variable geometrical parameters and a processor to execute a process, the process comprising:

determining, by the processor, boundary information associated with specified geometrical parameters of elements of the object, the boundary information indicating a state of contact between the elements;

dividing, by the processor, the variable geometrical parameters into a plurality of groups based on the boundary information;

eliminating the variable geometrical parameters located around boundaries from each of the plurality of groups generated by a completion of the dividing; and determining, by the processor, an objective function having a minimum order for each of the plurality of groups by an N-order polynomial modeling processing using the variable geometrical parameters which are included in each of the groups generated by a completion of the dividing and are subjected to an operation of eliminating the variable geometrical parameters located around boundaries from each of the plurality of groups as potential abnormal values.

13. The non-transitory computer readable medium according to claim 12, wherein the variable geometrical parameters includes coordinate data related to vertexes of shapes of the elements, and the process comprising:

determining line connecting the vertexes neighboring each other, and determining the state of contact between the elements based on a condition under which the lines intersect each other.

14. The non-transitory computer readable medium according to claim 12, the process comprising:

eliminating values of the plurality of objective functions corresponding a group, where an eliminating value is greater than a predetermined value.

15. The non-transitory computer readable medium according to claim 14, the process comprising:

dividing the variable geometrical parameters into a plurality of groups based on the eliminated values.

16. The non-transitory computer readable medium according to claim 12, which the minimum order is determined based on an approximation degree and a maximum modeling order limitation.

* * * * *